United States Patent [19]
Campbell

[11] Patent Number: 5,088,814
[45] Date of Patent: Feb. 18, 1992

[54] DRAWING PRODUCTION AIDE

[76] Inventor: Melanie T. Campbell, 12818 Milligan Ave., Cleveland, Ohio 44135

[21] Appl. No.: 603,388

[22] Filed: Oct. 26, 1990

[51] Int. Cl.⁵ ............................................. G03B 21/00
[52] U.S. Cl. ..................... 353/44; 353/101; 353/87; 33/1 K; 434/90; 434/88
[58] Field of Search ............... 353/28, 40, 42, 44, 353/DIG. 3, DIG. 5, 97, 119, 101, 87, 45; 350/121, 122; 362/285, 289, 371; 33/1 K; 434/90, 88

[56] References Cited

U.S. PATENT DOCUMENTS

| | | | |
|---|---|---|---|
| 1,111,608 | 9/1914 | O'Brien | 353/121 |
| 2,083,472 | 6/1937 | Reed | 353/44 |
| 2,263,101 | 11/1941 | Perry | 434/90 |
| 2,522,839 | 9/1950 | Reijns | 353/44 |
| 2,718,814 | 9/1955 | Baston | 353/44 |
| 3,086,296 | 3/1963 | Bergstrom | 434/90 |
| 3,632,197 | 1/1972 | Shelton | 353/44 |
| 3,660,903 | 5/1972 | Caperton Jr. | 33/1 K |
| 3,950,085 | 4/1976 | Grimm | 353/44 |
| 4,910,541 | 3/1990 | Morgan | 353/28 |

Primary Examiner—William A. Cuchlinski, Jr.
Assistant Examiner—William C. Dowling
Attorney, Agent, or Firm—H. Jay Spiegel

[57] ABSTRACT

A drawing production aide is disclosed which is designed to be placed over a working surface where an artist, engineer or architect is drawing. The device includes a carrier for a drawing and a light and lens system designed to project the drawing on the working surface. In a further aspect, the inventive aide includes an adjustable grid device designed to be used to visualize a scene in terms of a plurality of subsections, to best facilitate drawing the scene.

4 Claims, 3 Drawing Sheets

DRAWING PRODUCTION AIDE

BACKGROUND OF THE INVENTION

The present invention relates to a drawing production aide. In the prior art, devices designed to assist an artist, engineer or architect in drawing are known. However, Applicant is unaware of any such device including all of the aspects and features of the present invention.

Applicant is aware of U.S. Pat. No. 3,807,846 to Swank which discloses a microform reader having a grid permanently inserted into the optical system thereof to provide a visual coordinate location within the grid pattern. This is different from the teachings of the present invention which includes many features including a grid designed to be used to allow visualization of a scene for drawing purposes.

Applicant is also aware of U.S. Pat. No. 4,408,850 to Norek which discloses a drawing table having structure for projecting an image onto the working surface of the table from below to allow tracing. This is different from the teachings of the present invention which contemplates projecting of an image onto the working surface of a table from above with additional features including adjustable focusing and the provision of a separate grid aspect.

SUMMARY OF THE INVENTION

The present invention relates to a drawing production aide. The present invention includes the following interrelated aspects A) In a first aspect, the inventive drawing production aide is designed to be a self-contained structure including a support base designed to rest on the working surface of the associated table and to be maintained in position due to its weight.

B) Associated with the support base is a track which also sits on the working surface and is designed to support the base for laterally adjustable movements.

C) A post extends upwardly from the support base and supports illumination means including an elongated light, preferably of the fluorescent type, and a mirror of arcuate configuration designed to spread light from the fluorescent bulb evenly over the working surface. Below the fluorescent light, a work carrier is provided which is designed to hold work the image of which is intended to be projected onto the working surface in position under the fluorescent light and mirror.

D) Also mounted on the post for adjustable vertical movements is a magnifying means including a lens carrier and a lens. The magnifying means is provided so that when the work carrier is adjusted vertically with respect to the working surface, the lens carrier may be moved to adjust focus of the work image as projected on the working surface.

E) Adjustably mounted on the top of the post is a grid frame carrying a grid including a transparent sheet with grid markings thereon. The grid frame is provided to allow the user to visualize a scene which may be viewed by looking through and past the grid and to allow the user to mentally divide the scene into a plurality of sections to best facilitate drawing the scene on the working surface.

As such, it is a first object of the present invention to provide a drawing production aide.

It is a further object of the present invention to provide such a drawing production aide including a weighted base mounted on an elongated extending track.

It is a still further object of the present invention to provide such an aide having a work carrier mounted in adjacency to a light-mirror combination.

It is a still further object of the present invention to provide such a device with a focusing lens.

It is a still further object of the present invention to provide a device including a grid frame carrying a grid designed to allow the user to visualize a scene.

These and other objects, aspects and features of the present invention will be better understood from the following detailed description of the preferred embodiment when read in conjunction with the appended drawing figures.

SPECIFIC DESCRIPTION OF THE PREFERRED EMBODIMENT

Figure 1:
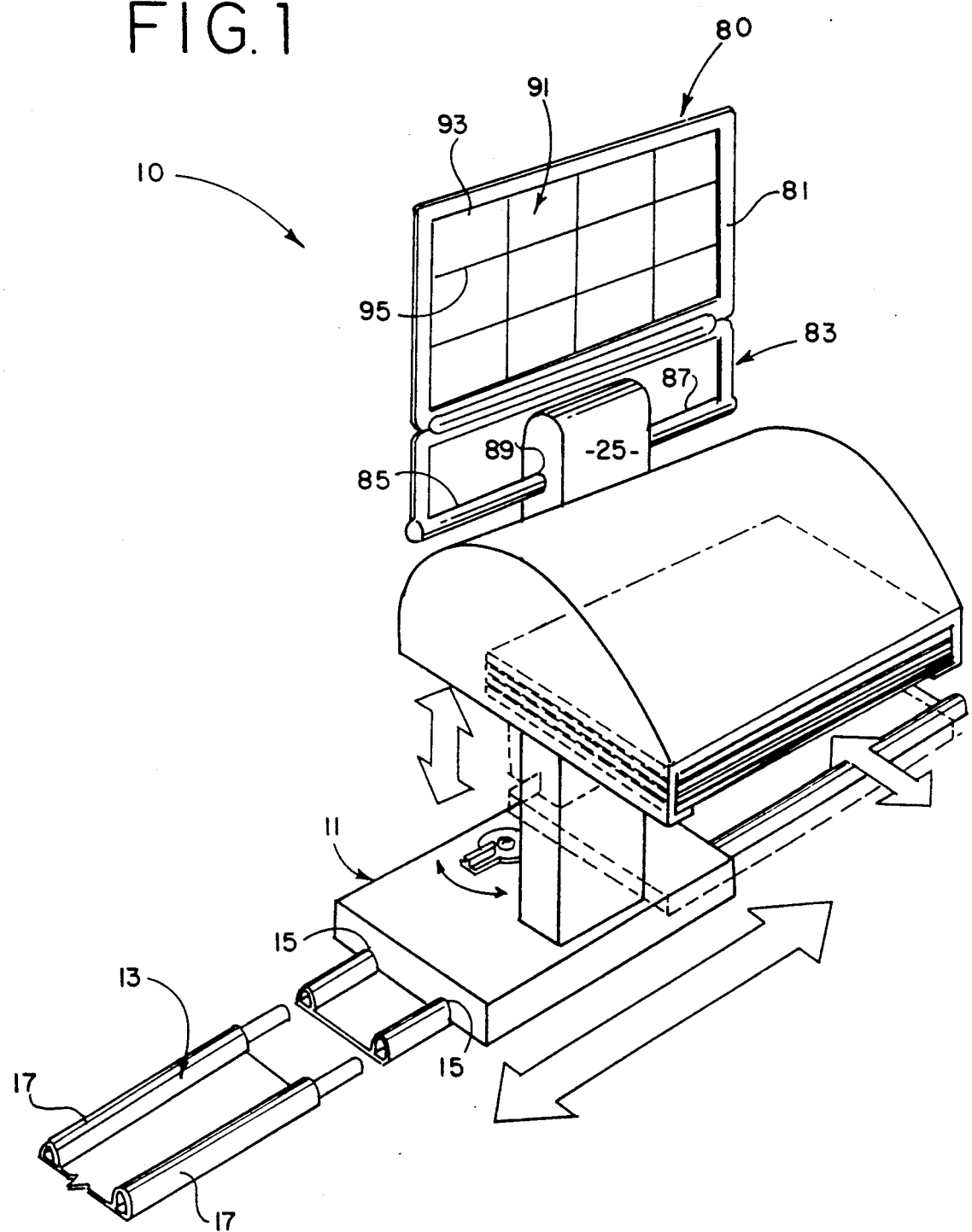
FIG. 1 shows a perspective view of the present invention.
Figure 2:
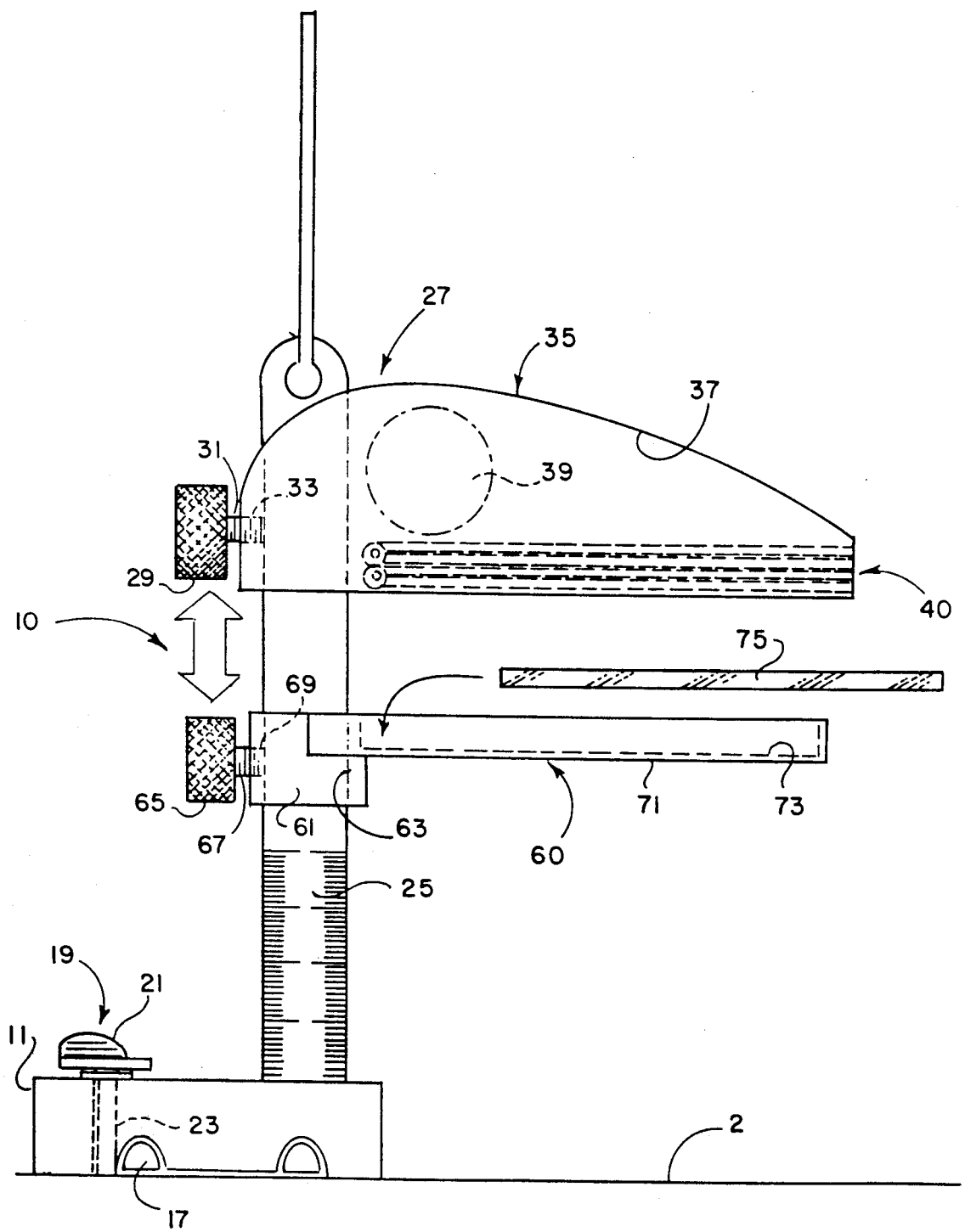
FIG. 2 shows a side view of the invention depicted in FIG. 1.

With reference, first, to FIG. 1, the present invention is generally designated by the reference numeral 10 and is seen to include a base 11 made of a heavy material designed to allow support of the device in position on a working surface, designated by the reference numeral 2 in FIG. 2.

As seen with particular reference to FIG. 1, the base 11 is supported on a track 13, with the base including elongated grooves 15 designed to mesh with projecting portions 17 of the track 13.

With particular reference to FIG. 2, a locking mechanism 19 is provided in the base 11 and includes a handle 21 and an elongated stem 23, preferably of oblong cross-section, and designed to frictionally engage the track 17 in one rotative position thereof and to be spaced therefrom in another rotative position thereof. In the rotative position wherein the stem 23 engages the track 17, the position of the base 11 with respect to the track 13 is fixed. In the other rotative position thereof, the base 11 is free to move along the track 13 to any desired location thereon.

With further reference to FIG. 2, it is seen that a post 25 extends upwardly from the base 11. The post 25 has illumination means 27 mounted thereon in sliding relation over the post 25, with the position of the illumination means 27 being adjustable vertically on the post 25. Locking means in the form of a knob 29 having a threaded stem 31 threadably received within a threaded recess 33 in the illumination means allows locking of the vertical position of the illumination means 27 with respect to the post 25 through frictional engagement of the end of the stem 31 with the post 25.

The illumination means 27 includes a housing 35 having an internal surface 37 which comprises a mirror, including a reflective surface made in any usual manner including, for example, making of the housing 35 of a metallic material and polishing the inner surface thereof, adding mirror-like material thereover, etc.

Also mounted within the housing 35 is a light 39 which, in the preferred embodiment of the present invention, consists of an elongated fluorescent tube. The relationship between the light 39 and the surface 37 is such that light emanating from the light 39 will be reflected by the reflective surface 37 and will spread evenly throughout the housing in a downward direction in the view of FIG. 2.

Figure 3:
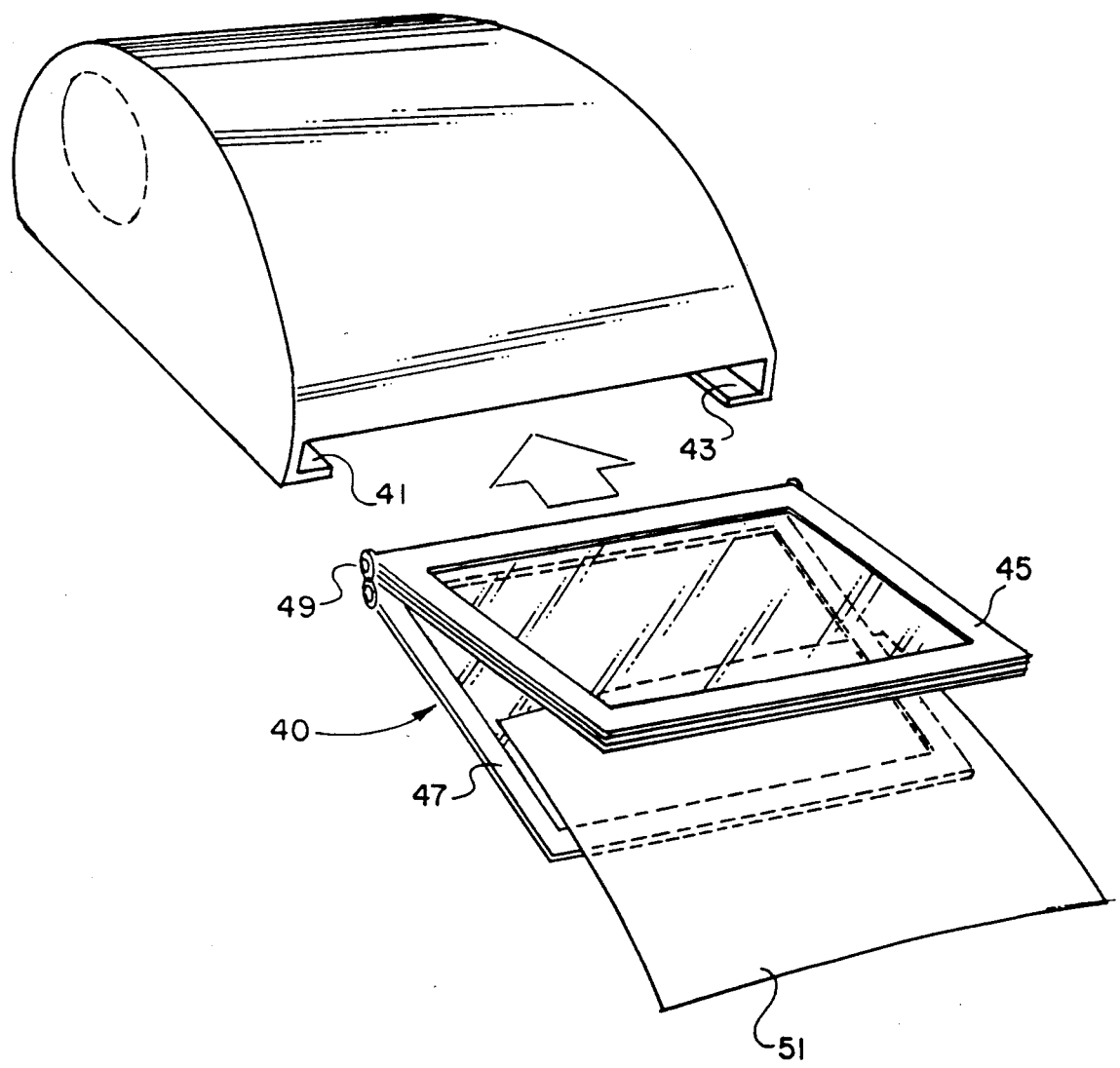
FIG. 3 shows an exploded view of a portion of the structure illustrated in FIGS. 1 and 2.

The illumination means 27 carries a work carrier 40 which, with reference to FIGS. 2 and 3, is slidably mounted within slots 41, 43 provided in the illumination means 27.

With particular reference to FIG. 3, the work carrier 40 consists of upper and lower plates 45, 47, respectively, which are pivotally mounted together at the pivoting hinge 49. When the plates 45, 47 are pivoted away from one another to the position shown in FIG. 3, a sheet 51, preferably a transparency, having a drawing thereon may be placed between the plates 45, 47, whereupon the plates may be pivoted together and slid along the slots 41, 43 to the position shown in FIG. 2 wherein the sheet 51 is contained within the housing 35 and in a position to have its image projected onto the working surface 2 by activation of the light 39 and reflection of light off the reflective surface 37 onto the sheet 51 to project the image thereof onto the working surface 2.

With reference back to FIGS. 1 and 2, also slidably mounted on the post 25 is magnifying means 60 including a post support 61 having a passageway 63 therethrough allowing slidable movements on the post 25 and having a locking mechanism in the form of a knob 65 having a threaded rod 67 threadably received within a threaded recess 69 in the support, with rotative movements of the knob 65 resulting in either engagement of the rod 67 against the post 25 to lock the vertical position of the magnifying means 60, or, alternatively, movements of the knob 65 result in release of the rod 67 from the post 25 to allow vertical adjustment of the magnifying means 60.

With further reference to FIGS. 1 and 2, the magnifying means 60 includes a lens carrier 71 attached to the support 61 and including a recess 73 designed to receive the lens 75 therein.

In the operation of the aspects of the invention described above, the inventive device 10 is placed on the working surface 2 in a desired location with the track 13 extending laterally along the working surface and the base 11 mounted on the track. In the manner described above, the lateral position of the base 11 with respect to the track 13 is adjusted and locked into place. A sheet 51 having an image which is intended to be projected onto the working surface 2 is placed between the plates 45, 47 and the work carrier 40 is placed within the illumination means 27 in the manner best shown in FIG. 2. Thereafter, the vertical position of the illumination means 27 with respect to the post 25 is adjusted as desired.

Thereafter, the vertical position of the magnifying means 60 is adjusted to place into focus the image which is being projected on the working surface 2 by virtue of the light 39, reflective surface 37, image on the sheet 51 and the lens 75. With the image in sharp focus on the working surface 2, the image may easily be copied on a drawing sheet (not shown) placed on the working surface 2.

In a further aspect, pivotally mounted on top of the post 25 is a grid carrier 80 consisting of a frame 81 and mounting means 83 including support rods 85, 87 entering recesses 89 in the post 25 with frictional retention therebetween allowing rotative adjustment of the grid carrier 80 with respect to the post 25 and retention of the orientation of the grid carrier 80 with respect to the post 25 in any desired rotative position thereof.

The frame 81 carries a grid 91 consisting of a transparent sheet 93 having grid markings 95 thereon. The grid carrier 80 is intended to be adjusted to a desired rotative position with respect to the post 25 and, is intended to be used in the following manner. The user gazes through the grid 95 to a scene behind the grid 95. The grid 95 divides the scene into a plurality of sectors and, through viewing the scene in this manner, the user may easily recreate the scene by drawing it on a sheet (not shown) placed on the working surface 2.

If desired, the mounting means 83 may be made of a flexible material allowing removal of the grid carrier 80 from the post 25 merely by pulling the rods 85, 87 away from the recesses 89 of the post 25 allowing easy removal when not needed.

As such, an invention has been disclosed in terms of a preferred embodiment thereof which fulfills each and every one of the objects of the invention as set forth hereinabove and provides a new and improved drawing production aide of great novelty and utility.

Of course, various changes, modifications and alterations in the teachings of the present invention may be contemplated by those skilled in the art without departing from the intended spirit and scope thereof. As such, it is intended that the present invention only be limited by the terms of the appended claims.

I claim:

1. A drawing production aide, comprising:
 a) a base placeable on a work surface, said base being slidably mounted on a track engaging said work surface;
 b) a straight support post extending upwardly from said base, said support post supporting:
   i) a work carrier mounted in a housing containing light means and vertically adjustable on said post via a first post surrounding support;
   ii) a separate focusing lens vertically adjustable on said post via a second post surrounding support; and
   iii) a grid carrier having a frame supporting a grid, said support post having an upper region with a recess therein, said grid carrier having support means entering said recess and rotatable with respect thereto to allow pivoting adjustment of said grid with respect to said work carrier, said grid being generally symmetrically disposed to either side of said support post.

2. The invention of claim 1, wherein said housing contains a mirror adapted to reflect light from said light means toward said work surface.

3. The invention of claim 2, wherein said work carrier includes a chamber adapted to receive a transparency having markings thereon.

4. The invention of claim 1, wherein said base includes locking means for locking the position of said base on said track.

* * * * *